(12) United States Patent  (10) Patent No.: US 8,677,132 B1
Liao et al.  (45) Date of Patent: Mar. 18, 2014

(54) DOCUMENT SECURITY

(75) Inventors: Yong Liao, Sunnyvale, CA (US); Antonio Nucci, San Jose, CA (US)

(73) Assignee: Narus, Inc., Sunnyvale, CA (US)

( * ) Notice: Subject to any disclaimer, the term of this patent is extended or adjusted under 35 U.S.C. 154(b) by 217 days.

(21) Appl. No.: 13/345,156

(22) Filed: Jan. 6, 2012

(51) Int. Cl.
*H04L 9/32* (2006.01)

(52) U.S. Cl.
USPC .......................................................... 713/176

(58) Field of Classification Search
USPC .......................................................... 713/176
See application file for complete search history.

(56) References Cited

U.S. PATENT DOCUMENTS

2007/0130166 A1* 6/2007 Takahashi ...................... 707/10
2009/0024670 A1* 1/2009 Petri ............................ 707/201
2010/0217988 A1* 8/2010 Johnson ....................... 713/175
2011/0269444 A1* 11/2011 Abel et al. .................... 455/418

* cited by examiner

*Primary Examiner* — Kambiz Zand
*Assistant Examiner* — Aubrey Wyszynski
(74) *Attorney, Agent, or Firm* — Fernandez & Associates, LLP

(57) ABSTRACT

A method for managing a secured document. The method includes storing and retrieving the secured document based on hybrid fragmentation and replication scheme to provide user viewing of the secured document by (a) generating an image representing human discernible content of the secured document, (b) modifying the image to generate a modified image that is embedded with a digital watermark, where the digital water mark is human indiscernible and represents a security policy extracted from the secured document, and (c) sending, to a secured device for displaying to the requesting user, the modified image embedded with the digital watermark.

23 Claims, 7 Drawing Sheets

(a) PAD Encoding Process (b) PAD Decoding Process

DOCUMENT SECURITY

BACKGROUND OF THE INVENTION

1. Field of the Invention

The present invention relates to computers and computer networks. More particularly, the invention relates to securely storing, viewing, and transmitting sensitive information in computerized documents.

2. Background of the Related Art

Most companies and government agencies have a dire need for protecting sensitive information. Encryption, access restriction, and locking documents behind firewalls are some common techniques for protecting sensitive information. Encryption is an effective way for preventing an unauthorized person from viewing the content of a sensitive document. Restricting access of a document to only a few individuals works well with trustworthy individuals. Unfortunately, it is common to find secret documents circulating outside their trusted rings and even in the public media. Identifying the untrustworthy person is often difficult and unpleasant. Firewalls are effective in banning casual outsiders from accessing an organization's network. Firewalls also make it difficult for a savvy computer hacker to break in. Unfortunately, firewalls cannot prevent an insider from copying a sensitive document onto a disk or emailing it to an outsider using a third-party Internet Service Provider (ISP) to avoid tracking.

Digital watermarking is the process of embedding information into a digital signal which may be used to verify its authenticity or the identity of its owners, in the same manner as paper bearing a watermark for visible identification. In digital watermarking, the signal may be audio, pictures, or video. If the signal is copied, then the information also is carried in the copy. A signal may carry several different watermarks at the same time. In visible digital watermarking, the information is visible in the picture or video. Typically, the information is text or a logo, which identifies the owner of the media. In indiscernible digital watermarking, information is added as digital data to audio, picture, or video, but it cannot be perceived as such

SUMMARY

In general, in one aspect, the present invention relates to a method for managing a secured document. The method includes (i) storing, by a first computer processor of a first secured document server, the secured document by storing each of a plurality of document shreds of the secured document in one of a plurality of distributed repositories, wherein the secured document comprises information regarding a security policy of the secured document, (ii) receiving, from a secured document user device, a request to access the secured document by a requesting user, and (iii) retrieving, in response to the request and by a second computer processor of a second secured document server, the secured document by combining the plurality of document shreds of the secured document retrieved from the plurality of distributed repositories, (iv) providing, when the request is authenticated based on a pre-determined criterion, the secured document to the requesting user, comprising (a) generating, in response to retrieving the secured document, an image representing human discernible content of the secured document, (b) modifying the image to generate a modified image that is embedded with a digital watermark, wherein the digital watermark is human indiscernible and represents the security policy extracted from the secured document, and (c) sending, to the secured document user device for displaying to the requesting user, the modified image embedded with the digital watermark.

Other aspects and advantages of the invention will be apparent from the following description and the appended claims.

DETAILED DESCRIPTION

Figure 1:
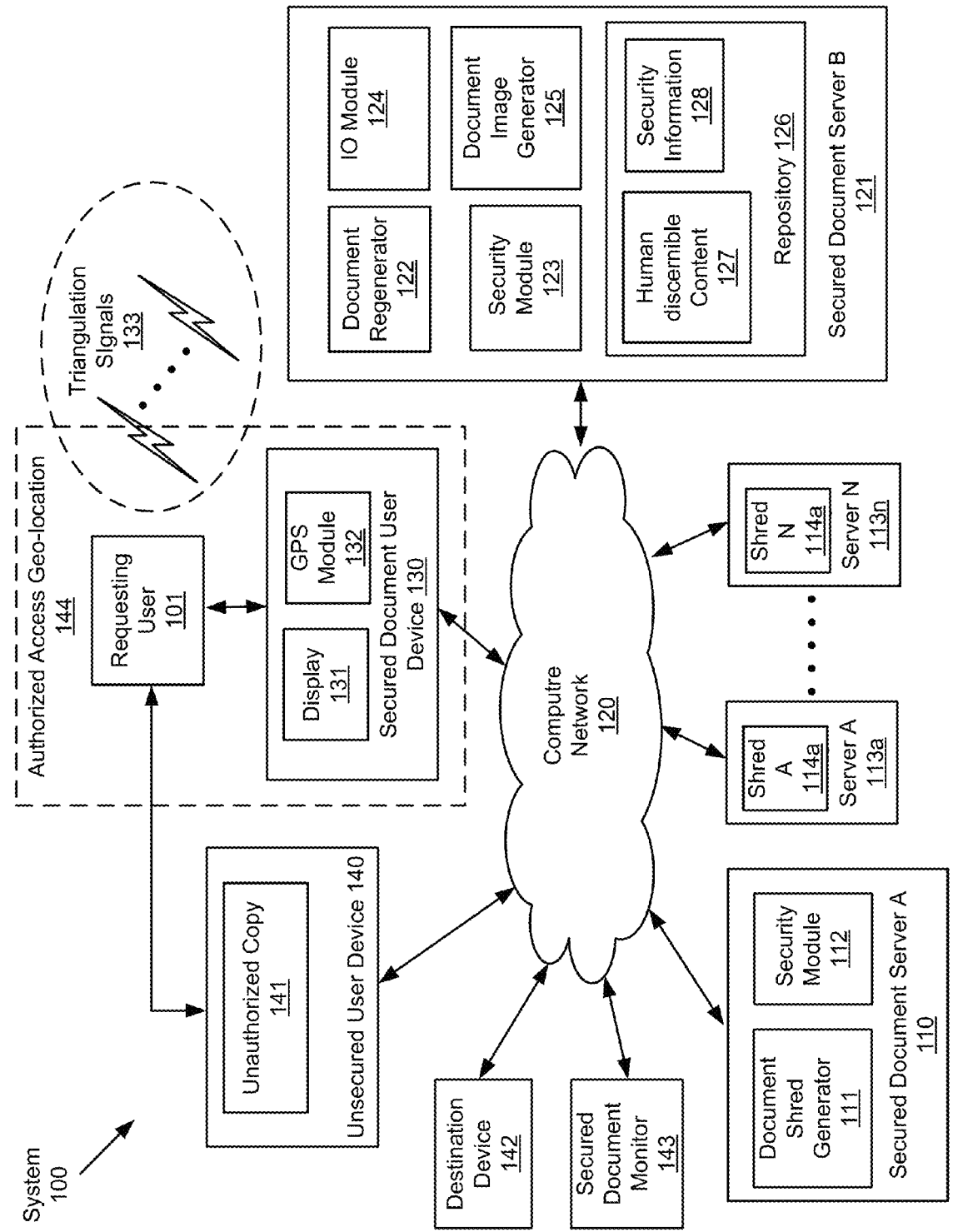
FIG. 1 shows a system block diagram according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

Embodiments of the invention provides a system and a method for managing a secured document. The secured document may be any document (e.g., containing text, graphics, images, etc.) of which the access is secured based on a security policy.

FIG. 1 shows a system block diagram of a system (100) in accordance with one or more embodiments of the invention. Those skilled in the art, having the benefit of this detailed description, will appreciate the components shown in FIG. 1 may differ among embodiments of the invention, and that one or more of the components may be optional. Although specific numbers of components are shown in FIG. 1, different number of each component may be included. In one or more embodiments of the invention, one or more of the components shown in FIG. 1 may be omitted, repeated, supplemented, and/or otherwise modified from that shown in FIG. 1. Accordingly, the specific arrangement of components shown in FIG. 1 should not be construed as limiting the scope of the invention.

As shown in FIG. 1, the system (100) is configured to manage secured documents and includes a secured document server A (110), a secured document server B (121), a distributed file storage system of multiple servers such as file server A (113a) through file server N (113n), a secured document user device (130) used by a requesting user (101) and receiving triangulation signals (133), a unsecured user device (140), a destination device (142), and a secured document monitor (143). Further, these various devices are coupled via a computer network (120) for interchanging data therebetween. In one or more embodiments, the computer network (120) may include wired and/or wireless segments of Internet, intranet, VPN, mobile phone network, WIFI, or any other suitable data communication network.

In one or more embodiments, the system (100) includes the secured document server A (110) that is configured to store a secured document (not shown) by storing, vi the computer network (120), each of a number of document shreds (e.g., shred A (114a), shred N (114n), etc.) generated from the secured document in one of the distributed data repositories (e.g., file server A (113a), file server N (113n)) where the secured document is embedded with, or otherwise contains, information regarding a security policy of the secured document. In one or more embodiments, the secured document server A (110) includes the document shred generator (111) configured to generates multiple document shreds (e.g., shred A (114a), shred N (114n), etc.) from the secured document (not shown). Further, the secured document server A (110) includes the security module (112) configured to generate security information based on a pre-determined security policy and embed the security information in the secured document prior to generating the document shreds (e.g., shred A (114a), shred N (114n), etc.) therefrom. In one or more embodiments, the secured document is fragmented into the document shreds based on file fragmentation and replication techniques known to those skilled in the art. In one or more embodiments, the secured document is fragmented into the document shreds based on file fragmentation and replication techniques known to those skilled in the art. In one or more embodiments, the document shreds are generated from the secured document is fragmented based on secret sharing techniques known to those skilled in the art. Secret sharing refers to a method for distributing a secret amongst a group of participants, each of whom is allocated a share of the secret. The secret can be reconstructed only when a sufficient number of shares are combined together; individual shares are of no use on their own. In one or more embodiments, the security information may include identification information of the source and authorized access device of the secured document, as well as access history and security policy of the secured document. In one or more embodiments, the security module (112) converts the security information into digital water mark to be embedded into the secured document. The digital watermark may be additional data items added into the secured document or merely alteration of the existing data items already present in the secured document. Such additional data item or the alteration of existing data item may be indiscernible to human but survives through electronic or optical copying process. Said in other words, although the digital watermark is indiscernible to a human, it continues to exist in an electronic or optical copy (e.g., a duplicated electronic file or a photo copy) and can be extracted therefrom using computerized algorithms.

In one or more embodiments, the document shred generator is configured in a by-pass mode, or is omitted from the secured document server A (110), such that the entire secured document is treated as one single shred stored in a single file server.

In one or more embodiments, the system (100) includes the secured document server B (121) that is configured to service a user request for access to the secured document. In general, multiple users may be storing and/or retrieving various secured documents to and/or from the distributed repositories at the same time. In one or more embodiments, according to a pre-determined load balancing scheme, the secured document server A (110) and the secured document server B (121) may be the same server or different servers selected from multiple servers in a server farm. In one or more embodiments, servicing the user request for access to the secured document includes (i) receiving, from a user device (e.g., the secured document user device (130)), a request to access the secured document by a requesting user (101), (ii) retrieving, in response to the request, the secured document by combining the document shreds (e.g., shred A (114a), shred N (114n), etc.) of the secured document retrieved from the distributed repositories (e.g., file server A (113a), file server N (113n)), and (iii) providing, when the request is authenticated based on a pre-determined criterion, the secured document to the requesting user (101). In one or more embodiments, the request is authenticated based on a user name, password, and/or other credential(s) of the requesting user (101) that are included, referenced, or supplied with the request to access the secured document. In one or more embodiments, the request is further authenticated accordingly to the security policy of the secured document, which may be embedded in the secured document itself.

In one or more embodiments, the secured document server B (121) includes the input/output (IO) module (124) that is configured to receive the request from the secured document user device (130) to access the secured document, retrieve shred A (114a), shred N (114n), etc. from the file server A (113a), file server N (113n), etc., and send the image of the secured document to the secured document user device (130) for displaying to the requesting user (101).

In one or more embodiments, the secured document server B (121) includes the document regenerator (122) that is configured to regenerate the secured document from the retrieved shred A (114a), shred N (114n), etc. In one or more embodiments, the document regeneration is based on the aforementioned file fragmentation and replication techniques known to those skilled in the art. In one or more embodiments, the document regeneration is based on the aforementioned secret sharing techniques known to those skilled in the art. In one or more embodiments, the aforementioned file fragmentation and replication techniques and the secret sharing techniques are modified such that regeneration of the secured document requires that the shred A (114a), shred N (114n), etc. are combined based on a particular order. In one or more embodiments, the entire secured document is treated as one single shred stored in a single file server in which case the document regenerator is configured in a by-pass mode, or is omitted from the secured document server B (121).

In one or more embodiments, the secured document is provided to the requesting user based on the security policy, which may restrict the access to the secured document for personal viewing only by the requesting user (101). For example, in response to retrieving the secured document and successfully authenticating the request, the secured document server B (121), or specifically the document image generator (125) contained therein, generates an image representing human discernible content of the secured document. In one or more embodiment, before this image is presented to the requesting user (101), the image is modified by the secured document server B (121) to generate a modified image that is embedded with a digital watermark. In one or more embodiments, the digital water mark is generated by the security module (123) of the secured document server B (121) and is human indiscernible and represents the security policy extracted from the secured document. For example, the digital watermark may be embedded by altering spatial positions of image pixels in the image. Such alteration may be at a sufficiently minute level that is not discernible to human eyes but can be detected and extracted by computer implemented method. Once the image is modified, the secured document server B (121) sends the modified image embedded with the digital watermark to the secured document user device (130) for displaying to the requesting user (101).

In one or more embodiments, the secured document server B (121) includes the repository (126) that is configured to store intermediate data used by various modules of the secured document server B (121), such as the human discernible content (127) that is generated by the document regenerator (122) and used as input by the document image generator (125). Such intermediate data may also include the security information (128) that is originally embedded in the secured document by the secured document server A (110) and is extracted and used by the security module (123) from the regenerated document to further generate the digital watermark.

Although the secured document server A (110) is shown in FIG. 1 to contain different set of modules than those contained in the secured document server B (121), additional modules exist such that each of the secured document server A (110) and the secured document server B (121) may perform similar functionalities according to the aforementioned load balancing scheme. These additional modules are merely omitted from FIG. 1 so as not to obscure the focus of the description.

In one or more embodiments, the secured document user device (130) is a secured device for accessing the secured document and is adapted to adhere to security policy of the secured document. In one or more embodiments, the secured document user device (130) includes the display (131) that is configured to display the modified image embedded with the digital watermark to the requesting user (101). For example, the display (131) may be a flat panel display such as LCD display, LED display, etc. that has sufficient pixel resolution to reproduce altered spatial positions of image pixels induced by the embedded digital watermark.

In one or more embodiments, the security policy of the secured document requires that access to the secured document is restricted to an authorized access geo-location (144). For example, the authorized access geo-location (144) may be specified based on a GPS (global positioning service) coordinates (in a public format or an encrypted format) with a pre-determined proximity range. Said in other words, the requesting user (101) is required to be within the pre-determined proximity range surrounding the center defined by the specific GPS coordinates for successful authentication to access the secured document. In one or more embodiments, sending the request by the requesting user (101) requires the requesting user (101) to be physically present with the secured document user device (130). For example, the secured document user device (130) may be configured to forbid remote log-in by any user. In another example, the secured document user device (130) may be configured with a biometric sensor to ensure the requesting user (101) is physically present to send the request from the secured document user device (130).

In one or more embodiments, for authenticating the requesting user (101) according to the geo-location based security policy, the security module (123) of the secured document server B (121) is further configured to determine, in response to the request from the requesting user (101) to access the secured document, a geo-location of the secured document user device (130) used by the requesting user (101) to send the request. Accordingly, the secured document image embedded with the watermark is sent to the secured document user device (130) for displaying to the requesting user (101) only when a match is determined/confirmed between the geo-location of the secured document user device (103) and the aforementioned authorized access geo-location specified in the security policy of the secured document. In one or more embodiments, the secured document server B (121) is further configured to generate an alert without providing the secured document image to the requesting user (101) when a mismatch is determined between the geo-location of the secured document user device (130) and the authorized access geo-location specified in the security policy of the secured document.

In one or more embodiments, the geo-location of the secured document user device (130) is determined by the secured document server B (121) based on information received from the secured document user device (130). Specifically, the secured document user device (130) includes the GPS module (132) that is configured to receive and analyze broadcasted triangulation signals (133) to generate a data item representing the geo-location of the secured document user device (130). In one or more embodiments, the triangulation signals (133) are broadcasted from commercial or military GPS satellites. In one or more embodiments, the triangulation signals (133) are broadcasted from other proprietary GPS satellites. Accordingly, the request to access the secured document sent from the secured document user device (130) includes this geo-location data item. In one or more embodiments, secured document server B (130) is further configured to receive, from the secured document user device (130), and decrypt (or otherwise analyze) this geo-location data item to determine the geo-location of the secured document user device (130). Accordingly, the secured document server B (130) proceeds to authenticate the request to access the secured document according to the geo-location based security policy.

As noted above, the security policy of the secure document may restrict the secured document to be retrieved for personal viewing only on a secured device, such as the secured document user device (130). In an example of security violation, the requesting user (101) may generate a photograph or photo copy of the displayed image on the display (131) and transmit the unauthorized copy (141) from the unsecured user device (140) via the computer network (120) to the destination device (142). In one or more embodiments, the system (100) includes the secured document monitor (143) that is configured to (i) intercept, for example on a random sampling basis or a heuristically selective basis from the computer network (120), data transmission to the destination device (142), (ii) determine that the data transmission contains the digital watermark indicating that the data transmission contains unauthorized content, (iii) extract the digital watermark from the data transmission to identify the security policy associated with the secured document, and (iv) generate an alert in response to detecting a violation of the security policy with respect to the data transmission to the destination device.

In one example, the security policy forbids any data transmission of the modified image embedded with the digital watermark. Accordingly, merely detecting that the modified image embedded with the digital watermark is being transmitted in the network traffic is sufficient to trigger the alert. In another example, the security policy restricts data transmission of the modified image embedded with the digital watermark to one or more authorized destination (not shown), in which case a mismatch between the destination device (142) and the authorized destination (e.g., defined by geo-location or Internet endpoint network address) triggers the alert. As noted above, the digital watermark may include identification information regarding the requesting user (101) and/or the secured document user device (130) for tracking purpose. Accordingly, the generated alert may also include such identification information for attribution any responsibility of security violation.

Figure 2:
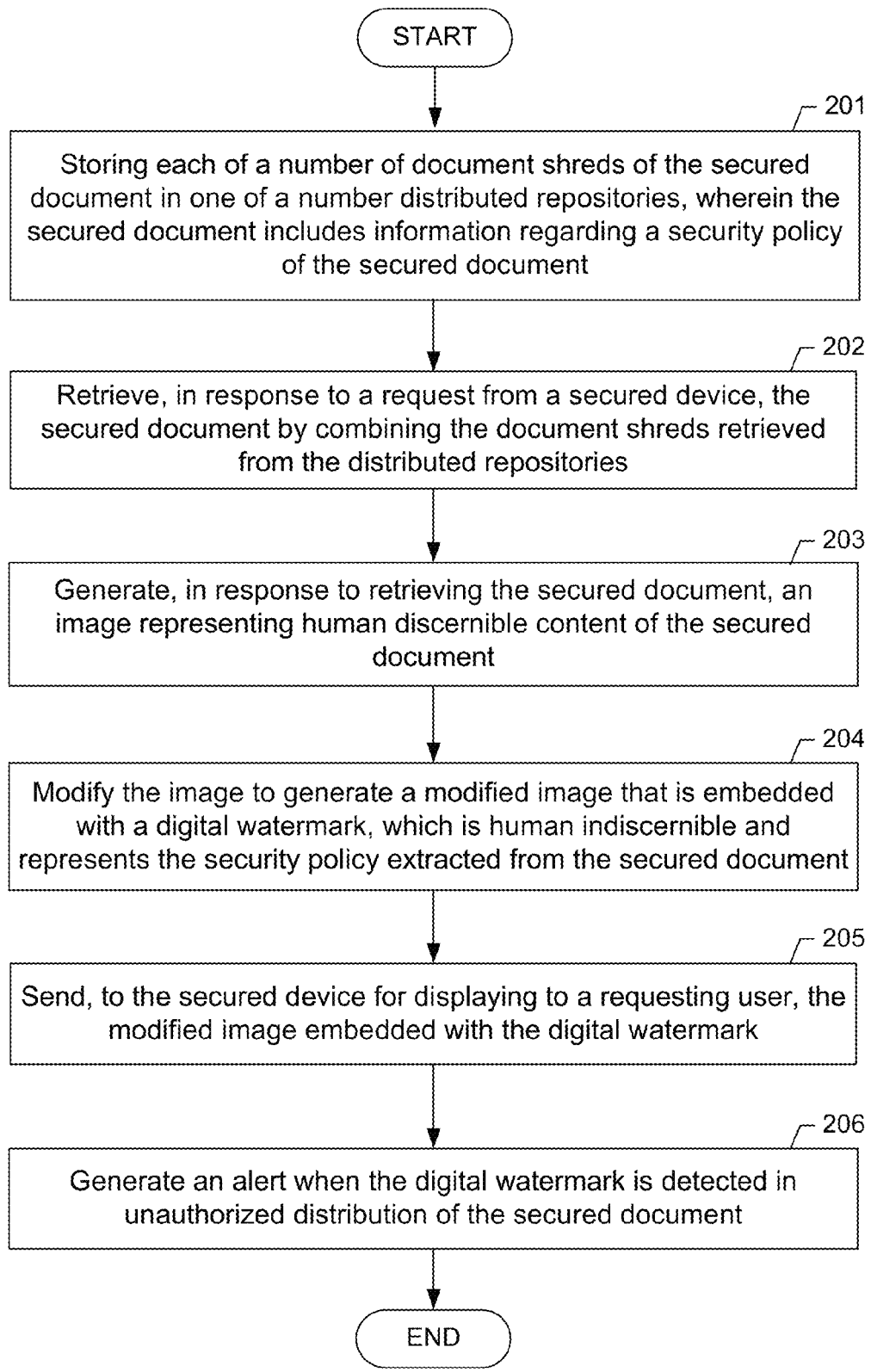
FIG. 2 shows a flowchart of a method according to aspects of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments of the invention, the method depicted in FIG. 2 may be practiced using system (100) described with respect to FIG. 1 above.

As noted above, the method shown in FIG. 2 focuses on managing a secured document. The secured document may be any document (e.g., containing text, graphics, images, etc.) of which the access is secured based on a security policy. Initially in Step 201, the secured document is stored by storing each of a number of document shreds of the secured document in one of a number of distributed repositories (e.g., the server A (113a) through server N (113n) of FIG. 1). In one or more embodiments, the secured document includes information regarding a security policy of the secured document. In one or more embodiments, the secured document is stored by a first secured document server (e.g., the secured document server A (110) of FIG. 1) coupled to the distributed repositories via a computer network, such as the Internet.

In Step 202, a request is received from a secured device (e.g., the secured document user device (130) of FIG. 1) to access the secured document by a requesting user. In response to the request, the secured document is retrieved by combining the document shreds retrieved from the distributed repositories. In particular, the retrieved secure document retains the security policy information initially included prior to be stored as shreds in the distributed repositories. In one or more embodiments, the document shreds is retrieved to regenerate the secured document by a second secured document server (e.g., the secured document server B (121) of FIG. 1). In one or more embodiments, a modified algorithm based on file fragmentation and replication techniques and secret sharing techniques are used to generate the document shred from the secured document and regenerate the secured document from the document shred. In the modified algorithm, regeneration of the secured document requires that the shreds are combined based on a particular order.

In general, multiple users may be storing and/or retrieving various secured documents to and/or from the distributed repositories at the same time. In one or more embodiments, according to a pre-determined load balancing scheme, the secured document server that stores the secured document and the secured document server that retrieves the secured document may be the same server or different servers selected from multiple servers in a server farm.

In one or more embodiments, when the request is authenticated based on a pre-determined criterion, the secured document is provided to the requesting user, as described in reference to Steps 203 through 205 below.

In Step 203, in response to retrieving the secured document, an image representing human discernible content of the secured document is generated from the secured document. For example, the image may be a bit mapped image based on a pre-determined pixel positioning format having a pre-determined number of pixels per scan line and a pre-determined number of scan lines per page. In general, the secured document may have multiple pages.

In Step 204, the image is modified to generate a modified image that is embedded with a digital watermark. In one or more embodiments, the digital water mark is human indiscernible and represents the security policy extracted from the secured document as well as access history of the secured document. For example, the security policy may impose restrictions on how the secured document is allowed to be distributed while the access history may include time stamp with geo-locations and user identification information regarding when, where, and by whom the secured document was accessed. In one or more embodiments, the digital watermark is embedded in the image by altering the pixel positions in the image where the alteration is limited to such extent that is indiscernible to human eyes. In particular, the alteration represents a computerized coding of the information contained in the security policy and the access history.

In Step 205, the modified image embedded with the digital watermark is sent, to the secured device (e.g., the secured document user device (130) of FIG. 1) for displaying to a requesting user. Specifically, the modified image embedded with the digital watermark is displayed using a display device having sufficient resolution to reproduce the digital watermark to any electronic copying device, such as a camera or a photo copier. Said in other words, while the embedded digital watermark is indiscernible to the human eyes, any copy (e.g., a photo captured using a camera or a photo copy captured using a photo copier) made from the display of the secured device would retain the digital watermark, such as the alteration of the pixel positions.

In Step 206, an alert is generated when the digital watermark is detected in unauthorized distribution of the secured document. In one or more embodiments, data transmission in the network traffic is monitored. For example, the monitoring may be based on random sampling to intercept random data transmission sessions. In another example, the monitoring may be based on intelligence information identifying certain suspicious person, suspicious user device, suspicious geo-location, or suspicious network domain. Accordingly, data transmission sessions associated with these suspicious entities may be intercepted for analysis. In one or more embodiments, the data transmission is monitored/analyzed using deep packet inspection or other suitable payload analysis techniques to identify any evidence of the digital watermark. For example, the data transmission may be analyzed to identify whether it contains image data and whether the image data contains pre-determined characteristics of the pixel position alteration used in encoding the security/log information contained in the digital watermark.

In one or more embodiments, the digital watermark, if present, is extracted from the data transmission to identify the security policy associated with the secured document. In this scenario, the image data contained in the data transmission is designated as a suspicious secured document of which the security policy is violated. Accordingly, an alert is generated in response to detecting the violation of the security policy with respect to the data transmission.

In one or more embodiments, the security policy forbids any data transmission of the modified image embedded with the digital watermark. In such embodiments, any detection of digital watermark or indication thereof may trigger the alert.

In one or more embodiments, the security policy restricts data transmission of the modified image embedded with the digital watermark to an authorized destination. In such embodiments, a mismatch between the destination device and the authorized destination specified in the security policy may trigger the alert.

In one or more embodiments, the security policy of the secured document requires that access to the secured document is restricted to an authorized access geo-location, such as within a particular building or a pre-defined perimeter. For example, the authorized access geo-location may be specified based on a GPS (global positioning service) coordinates (in a public format or an encrypted format) with a pre-determined proximity range. Said in other words, the requesting user is required to be within the pre-determined proximity range surrounding the center defined by the specific GPS coordinates for successful authentication to access the secured document. In one or more embodiments, sending the request by the requesting user requires the requesting user to be physically present with the secured device. For example, the secured evice may be configured to forbid remote log-in by any user. In another example, the secured device may be configured with a biometric sensor to ensure the requesting user is physically present to send the request from the secured device.

In one or more embodiments, the requesting user is authenticated according to a geo-location based security policy. Accordingly, in response to the request from the requesting user to access the secured document, a geo-location of the secured device used by the requesting user to send the request is determined first. The secured document image embedded with the watermark is sent to the secured device for displaying to the requesting user only when a match is determined/confirmed between the geo-location of the secured device and an authorized access geo-location specified in the security policy of the secured document. Otherwise, an alert is generated without providing the secured document image to the requesting user when a mismatch is determined between the geo-location of the secured device and the authorized access geo-location specified in the security policy of the secured document. Additional details of the geo-location based on security policy and the enforcement thereof are described in reference to FIG. 1 above and the application example below.

FIGS. 3A through 3D show an application example for managing secured documents. In general, a comprehensive solution for ensuring the security of sensitive documents may rely on a combination of multiple techniques. Instead, effective security must employ all the aforementioned techniques, and more. The application example described below tackles the problem of securely storing and viewing sensitive information, referred to as Program Authorization Documents (PAD), as a multilayered problem in which not only there have to be a secure mechanism for storing the PADs, but there must also be secure methods for watermarking, encrypting, and accessing them. In addition the entire solution should be resistant to direct attacks as well as possible insider threats. The example system is referred to as $S^3$, which stands for Shred, Scatter, and Secure the PADs.

The $S^3$ system consists of the $S^3$ backend and the $S^3$ client. The backend runs a server farm to serve the user requests from $S^3$ clients by processing PADs and storing PADs. A $S^3$ client runs in authorized device only and provides the interface for a user to interact with the $S^3$ backend. The $S^3$ system addresses the protection of sensitive PADs from the following three aspects: (1) it provides a PAD storage service that is highly secured against a wide range of attacks; (2) it provides a mechanism to enforce desired security policies when distributing PADs stored in the system; and (3) it provides rich information for logging and auditing how PADs stored in the system are accessed by users.

One salient feature of $S^3$ system is that the geo-location information of client device is included in authenticating the client, so that the system can grant geo-location based permissions to the client. For example, the $S^3$ system can deploy a policy that limits the accessing of a PAD to users located at certain locations only. The client geo-location is also reported to the $S^3$ backend for auditing and logging upon every PAD related operation on the client side. The clients precisely retrieve their geo-location using the xGPS Boeing proprietary technology, which is able to perform the task even under extreme terrain conditions where both commercial and military GPS fails such as indoor, canyons, etc.

Figure 3A:
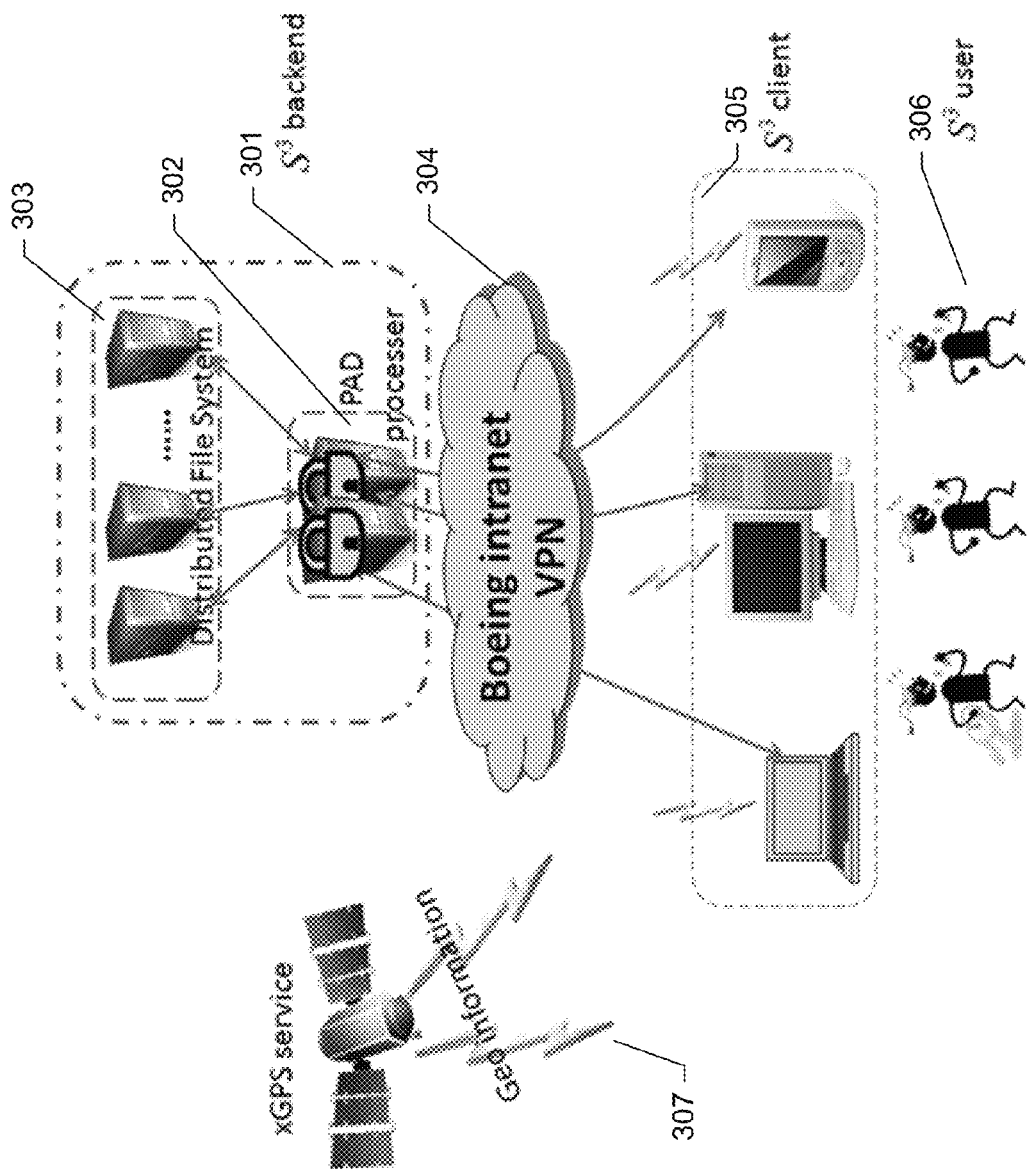
FIGS. 3A-3D show an application example according to aspects of the invention.

An overview of the $S^3$ system is shown in FIG. 3A. In the $S^3$ system, the $S^3$ backend (301) is responsible for storing and retrieving secured documents while the $S^3$ client (305) is responsible for provide user (306) viewing of the secured documents. Comparing the $S^3$ system to the system (100) shown in FIG. 1, the PAD processor (302) corresponds to the secured document server A (110) and the secured document server B (121), the Boeing intranet VPN (304) corresponds to a portion of the computer network (120), the distributed file system (DFS) (303) corresponds to server A (113a) through server N (113n), the $S^3$ client (305) corresponds to the secured document user device (130), the $S^3$ user (306) corresponds to the requesting user (101), and the geo-information (307) corresponds to the triangulation signals (133), respectively.

Each authorized $S^3$ device has specialized hardware and software able to phone-home (i.e., interaction with the Iridium satellite network using the Boeing proprietary xGPS technology) to retrieve its precise geo-location and communicate the geo-location back to $S^3$ backend (301). The $S^3$ backend (301) serves the requests from $S^3$ client (305), processes the PADs stores them in a secure manner, or retrieves a PAD from its storage DFS (303) and delivers it to display on a user's client device (305). $S^3$ client (305) connect to the backend (301) via VPN (304) or other secure tunnels deployed by Boeing IT. Anytime a client (305) submits a request to the backend (301) for uploading or viewing a PAD, the $S^3$ backend (301) in real time keeps track of (1) the user credential of the client (305), (2) the geo-location of the client (305), and (3) the identification of the client (305). The tracking information will be used at the backend (301) to enforce rich access control policies. The information will also be consumed by the backend (301) to audit and analyze PAD accesses.

The $S^3$ system adopts a thin-client design philosophy. As servers are usually easier to secure than clients, the PAD processing functionalities, which are the major features to ensure security properties of the entire system, are located at the backend side. The clients cannot directly communicate with the distributed file system at the backend. The $S^3$ client (305) implements only a carefully selected set of functionalities that are necessary to interact with the backend (301) in a secure manner.

An end user must use an authorized device in order to interact with $S^3$ backend (301). The access of $S^3$ system is constrained to authorized devices only because the devices need to have specialized hardware and software installed so the system can apply the desired security policies to protect sensitive information against both conscious and unconscious leakage.

From an unprivileged end user's perspective, the $S^3$ system offers two types of services: (1) the user can upload PADs into the $S^3$ system for storage; (2) the user can read PADs stored in the system. Note that in order to read a PAD, the user (306) must be online and connect to the $S^3$ backend (301). An unprivileged user cannot download the PADs in local disk for offline access. Disabling unprivileged users' offline access to PADs is based on a few practical considerations. Saving a PAD in local disk for offline access requires additional functionalities at the client side and built-in logic to the PAD file itself in order to achieve certain security guarantees, which therefore complicates the system design and implementation. As clients are usually more prevalent and less secure than servers, having more functionalities and logic at the client side provides more information to a malicious user to reverse engineering the system so as to compromise the protections we put on the entire system. Enabling users to locally store PAD requires the deployment of heavy-weight file rights management system. The negative impact of a cumbersome rights management mechanism to the overall user experience of the $S^3$ system is likely to discourage users from using the system, so as to leave sensitive information unprotected.

For a privileged user of $S^3$ system, he/she will have the ability to download PADs in local disk. In an example version of $S^3$ system, the rights to download PADs is granted to a very small set of users who are within a well defined "trusted ring" and are well educated to the protocols of handling sensitive information.

The following is the use scenario of $S^3$ system and discussion of the technical aspects on how the system serves the user requests.

As mentioned, a user interacts with the backend system (i.e., upload and view PADs) using authorized devices running $S^3$ client side software. The UI to a $S^3$ user is a web-based interface. The user first connects his/her device to Boeing intranet via VPN. Then the user opens a browser and connects to $S^3$ backend server. Upon connecting to the backend server, the backend authenticates the user via his user ID, the identification of his/her client device, and the geo-location of the user. After authentication, a user can access the system to upload and view PADs. If a user has the permission to add PADs into the system, he uses the web interface to upload a WORD or PDF file. Once the uploading is successful, the local copy of the PAD is automatically deleted from user's device. The user can specify permission of the PAD by granting reading rights to a set of users, or the system can apply certain default permission to the PAD. An example of the default permission setting is that a PAD can be viewed by users in the same team only. If a user has the permission, the user can search for PADs in the system using key words in PAD subject or title, and read the content of a PAD in the web browser. When a PAD is displayed on user device, the $S^3$ client side software ensures that (1) remote login service of the client device is disabled and no one can remotely use the device to access $S^3$ backend, so that the geo-location reported by the client device is indeed the geo-location of the user using this device; (2) it is indeed the user himself who is reading the PAD. If an authenticated user opens a PAD and leaves this machine, someone else cannot read the PAD displayed on that user's screen. Each user operation, i.e., uploading a new PAD, searching for a PAD, reading a PAD, will be authenticated based on the user geo-location at the time the operation is performed. Each operation will also be logged by the backend system for later auditing and analyzing. The information logged by the system includes time stamp, user identification, user geo-location, and client device identification. In this way, the system has a complete view of when a PAD is touched by who, from where, and using which device.

Once a user is authenticated and the user uploads a new PAD, $S^3$ backend properly processes the PAD and securely saves it into a distributed storage system (DFS). The PAD is first converted into secure enabled PDF format and watermarked with a signature which embeds a unique ID of the PAD. The backend system records the association between ID of the PAD to the user who uploads the PAD, the geo-location of the device used to upload the PAD at the time of the uploading, and the identification of the device. The watermarked PDF is then encrypted via strong asymmetric encryption mechanism. The encrypted PDF is shredded into a large number of pieces, where each piece is called a shred. The shreds are then randomly distributed to a DFS for storage. The metadata of a PAD, including the ordering of assembling shred into the encrypted PDF, the key to decrypt the encrypted PDF, the permission set, etc, are saved in external database. The database is protected and secured by existing state-of-the-art mechanisms to ensure availability, integrity, and confidentiality.

Upon receiving a reading request from a user client, the $S^3$ backend checks the permission of the user for reading rights. If the user has the permission, the backend issues a series of GET requests to the DFS so as to retrieve all the shreds of a PAD. The shreds are then assembled according to the order information stored in the metadata database. Once assembled, the $S^3$ backend decrypts the PAD using the key stored in metadata database as well. After decryption, the PDF is watermarked again. This watermark embeds a set of indiscernible information into the document layout and identifies (1) when the PAD request event occurs, (2) identification of the user who requests the PAD, (3) user geo-location at the time of requesting the PAD, and (4) identification of the device used to request the PAD. After watermarking is applied, the $S^3$ backend delivers the PAD for displaying in user's browser. Note that the user can only read a PAD in browser. The web server running at the $S^3$ backend has special built-in logic to prevent user from downloading the PAD and copying content of the PAD.

Data theft, which might be as sophisticated as packet sniffing or as simple as stealing a compact flash drive, motivates the need for a fully distributed secure storage system that guarantees high data availability, confidentiality and integrity. The Distributed File System (DFS) technology provides an attractive solution to this problem. Several systems have been proposed in literature based on different combinations of techniques such as file-fragmentation, file-replication and file-encryption techniques. Table 1 lists the terminology used throughout the disclosure.

TABLE 1

| Team | Meaning |
|---|---|
| USER-ID | The identification a user who uses $S^3$ system. It is pre-generated for each user of the $S^3$ system. For example, the ID of a user can be synced from existing Active Directory service. |
| USER-GEO | The geo-location of a user using $S^3$ system. It is provided by the xGPS hardware of a user's machine. The client side software reports this information to $S^3$ backend each time a PAD is touched at the client. |
| PAD-ID | The unique ID of PAD. It is used internally by the $S^3$ backened to identify a PAD. It is automatically generated by the backend when a PAD is uploaded into the system. |
| PAD-PWD | The password used internally by the $S^3$ backend to protect the metadata of a PAD. It is generated by the backend system when a PAD is uploaded into the system. It is saved in a database hosted by machines different from those used to save the PAD. |
| shred | A small piece containing partial content of a PAD. Shreds are generated when a PAD is uploaded into $S^3$ and processed by the backend system. |
| black-shred | A shred containing useful information of a PAD. |
| white-shred | A shred randomly generated by the system when processing a PAD. WHITE-SHREDs of a PAD are mixed with its BLACK-SHREDs by the backend system, so as to make recovering the PAD harder for unauthorized users. |
| Shred-ID | The unique ID of a SHRED used internally by the $S^3$ backend system to identify a shred. It is automatically generated by the backend system when a new shred is produced during the PAD processing process. Both BLACK-SHREDs and WHITE-SHREDs have unique SHRED-ID. |
| WPAD | A watermarked PAD. Watermarks are added to a PAD when the PAD is first uploaded into the $S^3$ backend system, and when a user downloads a PAD out of the $S^3$ backend system. |
| EWPAD | An encrypted and watermarked PAD. When a new is PAD uploaded into the system, it is watermarked and then encrypted by the appropriate public key. |
| DEVICE-ID | The unique ID of a client machine used by a user to access $S^3$ system, e.g., the MAC address of the NIC, the sequence number of the CPU, or a unique ID assigned by the system to each client device. The client side software reports this information to $S^3$ backend each time a PAD is touched at the client. |

Figure 3B:
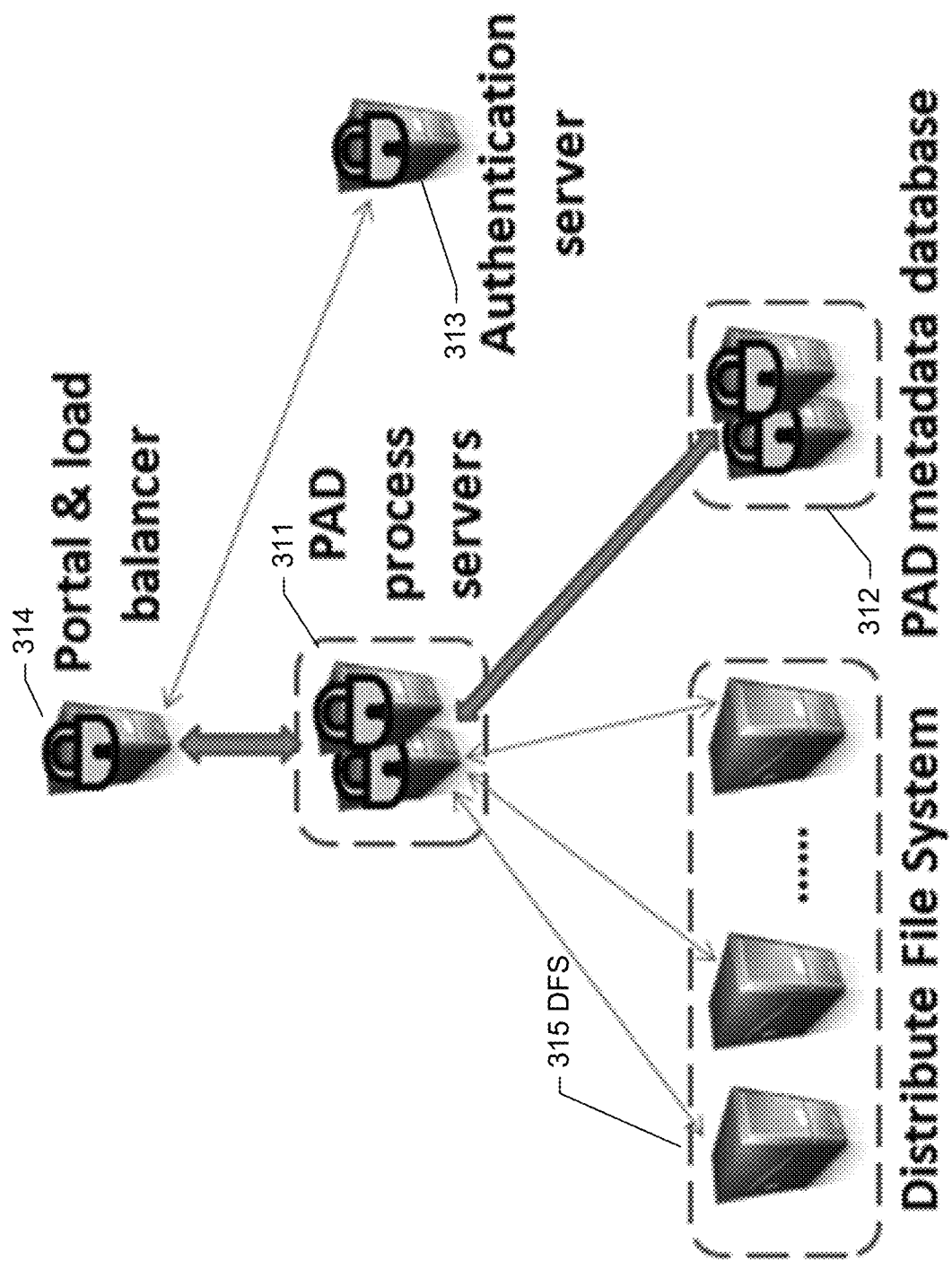

The high level system architecture of the S³ backend (301) is shown in FIG. 3B. Two main components of the S³ backend (301) system architecture are PAD processing component and PAD storage component. The PAD processing component (corresponding to the PAD processer (302) and including the PAD process servers (311), PAD metadata database (312), authentication server (313), and portal & load balancer (314)) is a middle layer between the S³ client (305) and the storage component (i.e., DFS (315), corresponding to DFS (303) of FIG. 3A). As depicted in FIG. 3B, the PAD processing component consists of multiple PAD process servers (311) running special logic to (1) process PADs and generate shreds for storing in the storage component, and (2) retrieve shreds from the storage component DFS (315), recover the PADs from shreds, and process the PAD again before delivering to the S³ clients (305) of FIG. 3A. The detail functionality description of the PAD processing component is described later. The PAD storage component DFS (315) is built from multiple geographically separated storage nodes. In an example, the S³ backend (301) of FIG. 3A uses a DFS (303) in an as-is manner as long as the DFS (303) has built-in logic to handle replication and balance shreds across the storage nodes.

The portal & load balancer (314) is a web server serving as the portal to S³ backend (301) and balancing the load to a cluster of PAD process servers (311). User authentication is handled by the authentication server (313). Each PAD has a set of associated metadata and the metadata are stored in a separate database cluster depicted as PAD metadata database (312) in FIG. 3B. The example system decouples the PAD metadata and storage of shred so as to achieve better PAD protection property. Both the PAD metadata and the shreds generated from the PAD are needed in order to recover the PAD, compromising either the PAD metadata database or the DFS will not compromise the PAD.

The S³ system leverages a simple, yet powerful concept of concealment through random shreds distribution. The main intuition behind such approach is to first encrypt the entire document, then break the document into tiny shreds, add noise shreds not containing any useful information associated to the original document (to increase the cardinality of the permutation), and then randomly distribute them to a DFS with geographically separated nodes, so that only authorized users of the S³ system can precisely locate the pieces and recover the original data after reassembling the shreds in the right order.

Figure 3C:
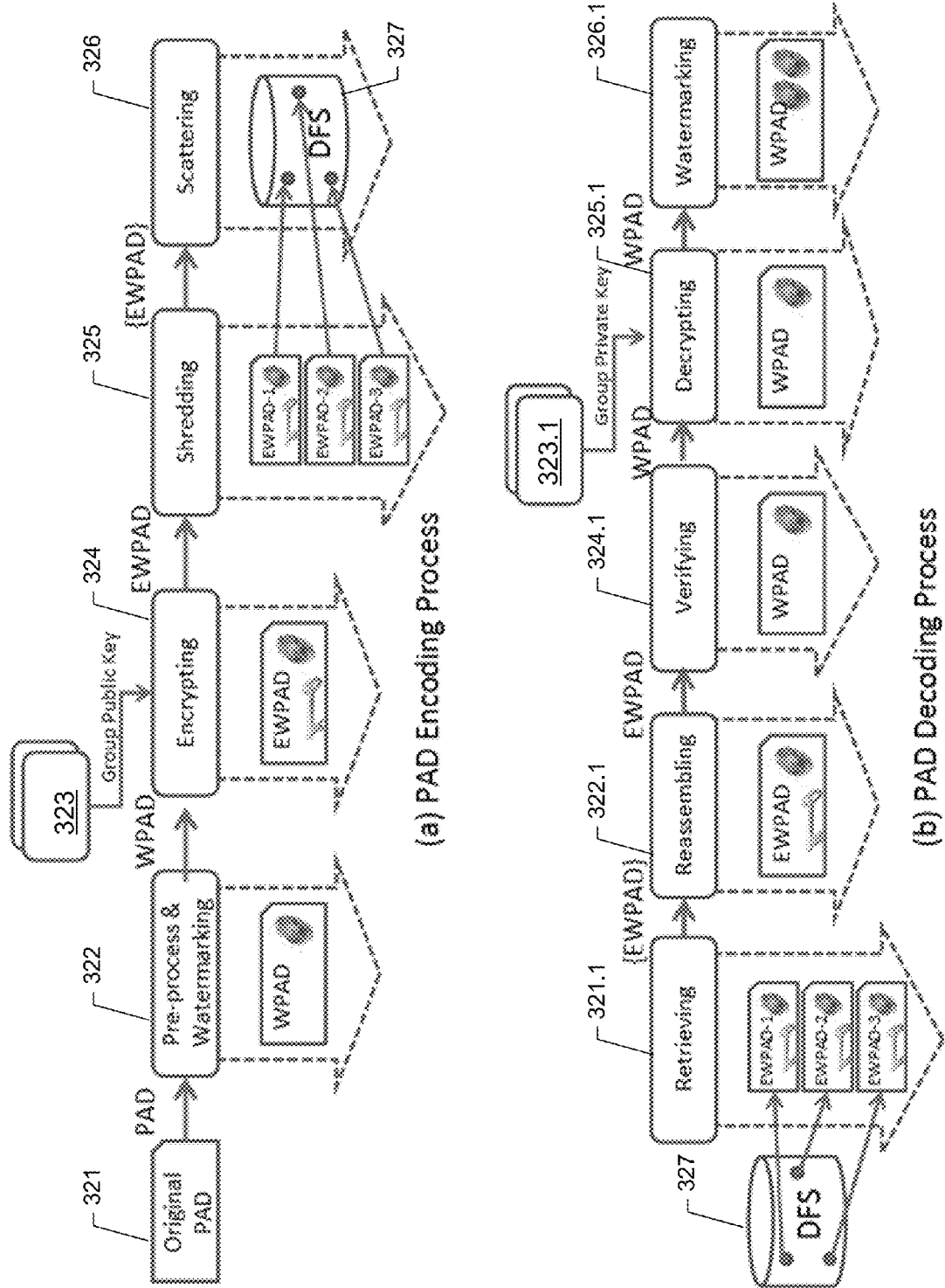

FIG. 3C is an overview of PAD Encoding/Decoding process at S³ backend (301). Storing a PAD in S³ backend (301) starts with an authenticated user uploading a PAD via a web browser. How to authenticate a user and what policies can be applied in authentication will be described later in reference to FIG. 3D with details about the S³ client. As shown in FIG. 3C, once the PAD (321) is received by the backend, the system generates a unique ID for this PAD, referred as PAD-ID, and a random password, referred as PAD-PWD. The PAD-PWD of the PAD (321) is saved in PAD metadata database. Both the PAD-ID and PAD-PWD are used internally by the backend system without exposing to end users. The backend system logs the PAD uploading event by associating the PAD-ID with USER-ID, USER-GEO, and DEVICE-ID, so that the information is tracked regarding the uploading of the PAD (321) by whom, from where, and using which device. The actual PAD processing can be broken into four logical steps: pre-processing and watermarking the PAD (step 322), encrypting the PAD (step 324), splitting the PAD into pieces (step 325), called PAD shreds, and storing the shreds into physical/geographical separate servers (step 326). These steps, referred as "PAD Encoding Process" are represented in FIG. 3C as (a) PAD encoding process.

The first step 322 is to pre-process the PAD (321) and to make it ready for storage. After the pre-process, watermark of the PAD (321) is added by embedding its PAD-ID into the PAD (321). In one example, the watermarking is done via the "line-shifting" mechanism to achieve robustness and reliability. The processed PAD (321) is referred to as WPAD. Furthermore, the WPAD is immediately converted into security enabled PDF format which disables modification of the PAD. The PAD-PWD will be used to as the key of this security enabled PDF. The PDF is then delivered to the encryption module. The encryption module uses asymmetric encryption and the appropriate public key (323) to produce an encrypted PAD. Notice that there can be different public keys (323) based on which division, project, etc, the uploaded PAD (321) belongs to. The processed encrypted and watermarked PAD is referred as EWPAD. The system then computes a hash verification value of the EWPAD and stores the hash value into an external database. The newly created EWPAD will be split into multiple storage units, called shreds. The system then generates a set of random shreds and interleaves them with the shreds containing pieces of the EWPAD. These shreds that retain the content of the original PAD are referred as black-shreds, and the randomly generate shreds are referred as white-shreds. Each shred is assigned a unique ID, referred as shred-ID. The metadata of a PAD, including (1) the shred-IDs of all shreds generate from this PAD, (2) whether a shred is a white-shred or a black-shred, and (3) the ordering of concatenating the black-shreds in recovering the EWPAD, will be stored in the PAD metadata database. After the metadata is saved, the shreds are sent to the DFS (327) in a random order for storage.

The process of retrieving PADs out of the DFS is depicted in FIG. 3C as (b) PAD decoding process. To retrieve a PAD from the system, a S³ client must first authenticate with the backend system for proper rights. Once authentication successes, the user can click a link in web browser and the client side software sends the PAD-ID of the PAD to S³ backend server. The backend PAD process server then queries the PAD metadata database to get the shred information for this PAD-ID, including what are the shred-IDs of all shreds, what is the order to assemble those shreds, and where to get all shreds. The PAD process server issues a series of GET requests against the DFS to retrieve all the associated shreds (step 321.1). After all the shreds are correctly retrieved from the DFS, the EWPAD can be reconstructed by filtering out those white-shreds and concatenating the black-shreds together in the proper order (step 322.1). The EWPAD is then verified (step 325.1) against its hash verification value stored by the encoding process. Once the PAD verification is successfully completed, the EWPAD is decrypted by using the appropriate private key (323.1) and watermarked again (step 326.1) by embedding USER-ID (identifying the user who requests this PAD), USER-GEO (the geo-location of the user when requesting this PAD), DEVICE-ID (identifying the device used to request this PAD). Then the content of the PAD is delivered to the client side and displayed in user's web browser. Note that an unprivileged user can only read the PAD in web browser. Only privileged users can download the PAD into local disk. As a PAD is processed by the PAD processing component, the system checks the credential of the user who initiates the request to ensure the user has the necessary permission to proceed in each step, such as checking for user's permission in using the group public/private keys. All user activities will be logged by the S³ backend system for later audit or examination.

In order to interact with the $S^3$ backend, a user must use authorized device with specific hardware and software installed by Boeing IT. The authorized device can receive signals from xGPS satellites and compute geo-location information of the device. An authorized device also has built-in webcam hardware so the $S^3$ client side can apply security policies based on user biometric information. In an example version of $S^3$, authorized devices include laptop and desktop PCs as well as mobile devices such as a smartphone.

The client device will have a system service running in its OS, referred as S3-SRV. The S3-SRV will run as long as a client device is connected to the Boeing intranet. For example, on Windows OS, the domain controller can enforce this by deploying a group policy. When a user is interacting with $S^3$ backend system using a web browser, $S^3$ backend delivers a set of Java applets to run inside the web browser. The Java applets communicate with the S3-SRV service to enforce the security policies required by the $S^3$ system. The Java applets will be digital signed so as to be granted the permission to access all local resources of the client device, even they run in a sandbox environment of the browser.

Figure 3D:
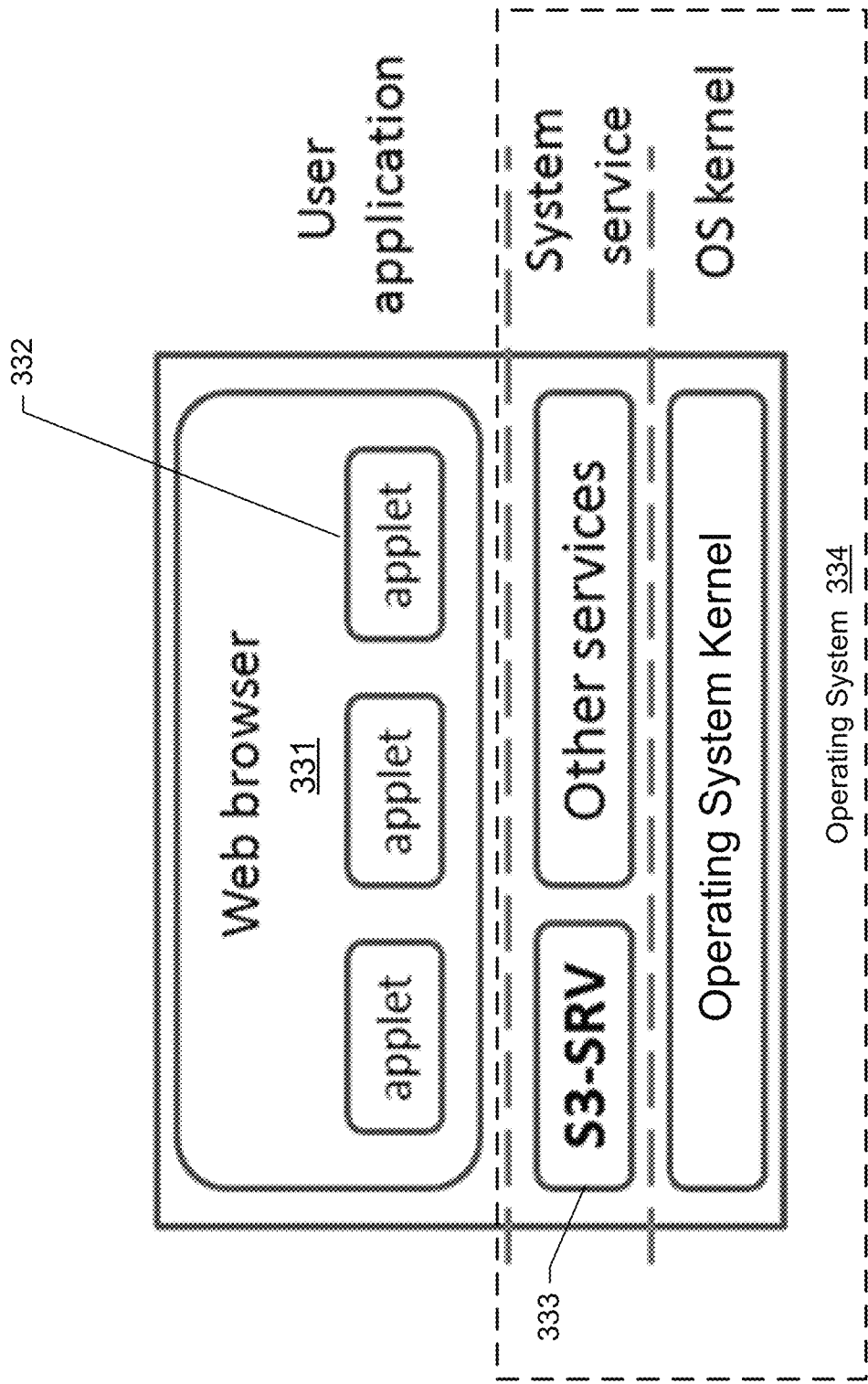
Figure 4:
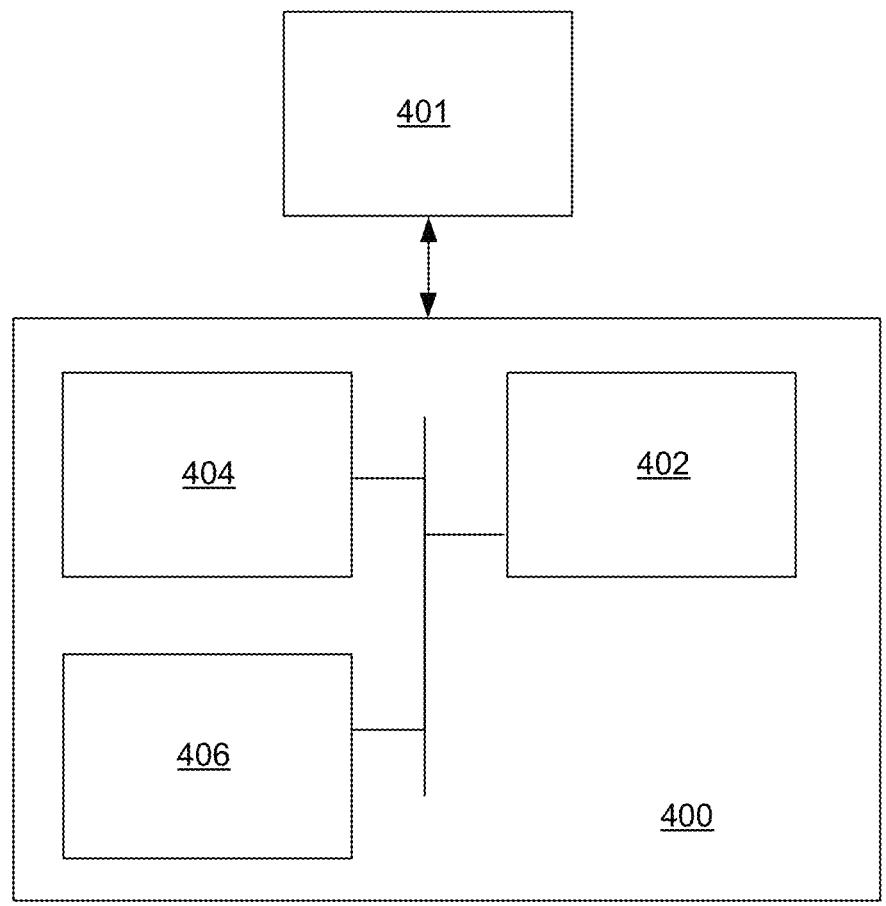
FIG. 4 shows a computer system according to aspects of the invention.

FIG. 3D is a system overview of a $S^3$ client (305) of FIG. 3A. As mentioned, web browser (331) is the UI interface for a user (306) to interact with $S^3$ backend (301). When user's web browser (331) connects to the $S^3$ backend (301), the $S^3$ backend (301) authenticates the user (306) based on the following information: (1) USER-ID, (2) DEVICE-ID, and (3) USER-GEO. Note that during user authentication, the $S^3$ backend (301) can check whether the user (306) is already connected to the $S^3$ backend (301) from another geo-location. If it is, this indicates a potential user identification theft and the system will fire an alarm. For an underlying operating system (OS) (334), user (306) needs to type user name and password in the web browser (331). For client devices running Windows OS, the windows login account can be used to authenticate the USER-ID with built-in support for windows authentication.

Once a user successfully authenticates with the $S^3$ backend (301), the $S^3$ backend (301) delivers an applet (332) (e.g., Java applet) to run in user's browser (331). This applet (332) will periodically communicate with a software module S3-SRV (333) running inside the client OS (334). As long as the applet (333) is communicating with the S3-SRV (333), the S3-SRV (333) service will disable remote login to the client (305) in order to prevent a malicious user form using the client (305) remotely and therefore the $S^3$ backend (301) cannot keep track of where the user is physically located when he/she is interacting with the $S^3$ backend (331). The S3-SRV (333) service will disable PrintScreen function of the OS (334) as well, in order to prevent a malicious user from stealing the PAD content displayed in web browser (331) by capturing the device screen. The S3-SRV (333) service can also disable USB storage of the client (305). If S3-SRV (333) service does not receive data communication from the Java applet (332) for a pre-defined time period, S3-SRV (333) will enable remote login to the client (305) if the default configuration on the client (305) is enabling remote login. Similar arrangement applies to disabling/enabling the PrintScreen function of the OS (334) and USB storage of the client (305).

A user successfully authenticated by the $S^3$ backend system can upload new PADs and view existing PADs, if the user has the upload rights. To add a new PAD into $S^3$ backend (301), a user uses the web browser (331) to upload a file. In the HTTP POST request sent to $S^3$ backend (301), USER-ID, DEVICE-ID, and USER-GEO are included in additional to the content of the PAD file. Therefore, the $S^3$ backend (301) will be able to log who uploads a PAD at what time, from where, and uses which device. In the file uploading page, an embedded Java applet (332) will record the local path of the PAD file and delete the file after it is successfully uploaded into the $S^3$ backend (301). Based on whether the deleting is successful or not (e.g., in Windows OS, a file cannot be deleted if another program is using it), the Java applet will send different acknowledgements to the backend for logging and auditing.

A successfully authenticated user can view PADs stored in the $S^3$ backend using web browser, given that the user has the read rights for the PADs. To view a PAD, the user clicks a link in his/her web browser and in the HTTP GET request sent to $S^3$ backend, USER-ID, DEVICE-ID, and USER-GEO will be included so the backend can log and audit this PAD reading event. After the backend processes the request (i.e., assembling shreds, decrypting the PAD, and watermarking the PAD), the content of the PAD is delivered to the client and displayed in user's web browser. A user can read PADs but cannot download them into local disk. The user cannot copy the PAD content either. When delivering the web page to client browser so as to show a PAD, a Java applet will be delivered to run in user's web browser. This applet opens user's webcam device and periodically sends the user's facial information to $S^3$ backend for authentication. This is to ensure that it is indeed the user himself reading a PAD after the PAD is displayed on screen. When it is detected that the person reading a PAD is different from the person authenticated to access the PAD, or no one is sitting in front of the client machine reading the PAD, or multiple persons are reading a PAD, the $S^3$ backend can disconnect the session with that suspicious client, or turn the device screen into a blank screen, or fire an alarm to inform the system administrators, so as to protect against any potential PAD leakage to unauthorized users.

A successfully authenticated privileged user can download PADs from the $S^3$ backend to local disk and save them as security enabled PDF format. The downloaded PADs will still be watermarked by the $S^3$ backend before being delivered to the privileged user. The watermark can be used to identify who downloads a PAD from the $S^3$ backend, from where and by which device. In the first version of $S^3$ system, we assume it is the user's responsibility to protect a PAD once the PAD is downloaded to user's local disk.

The security of $S^3$ system is based on several overlapping mechanisms, each of which can be independent and complementary to the others. If any of the security mechanisms fails, the system still remains secure. In fact even if several of the mechanisms fail simultaneously the system will remain secure with no useful data being exposed. In addition, if the data is exposed, there is a built in mechanism to determine the level and type of exposure quickly. The individual security mechanisms are:

(1) Restricted and secure access to the $S^3$ backend.

Only authorized $S^3$ clients can access the $S^3$ backend. The $S^3$ backend server farm is protected by firewall and IDS devices to defend attacks from outside.

All communications between $S^3$ clients and $S^3$ backend servers are performed over an encrypted means, either HTTPS or similar and the certificates used in the system will be signed signing authority. The communications between servers in the $S^3$ server farm are secured by encryption as well.

A user must be physically with the authorized device in order to interact with the $S^3$ backend.

(2) Secured storage of PADs in $S^3$ backend.

Standard asymmetric encryption techniques are used to encrypt the newly created and watermarked PAD. The only key on the server is the public key, which is used for encrypted the PAD. This public key cannot be used to decrypt the PAD. Thus, even if the physical server(s) are compromised, the PADs stored on them cannot be decrypted. In addition the modern asymmetric encryption techniques can be more then sufficiently secure against all attacks.

Each encrypted and watermarked PAD is passed through a shredding algorithm and the pieces are then distributed among many servers together with certain amount of randomly generated noise shreds. It can be a substantial task to attack multiple physically/geographically separated servers in order to collect enough shreds to recover the original PAD.

Even an attacker successfully attacks multiple servers and obtains the shreds, now the attacker needs to figure out the right order to concatenate the shreds and filter out those noise shreds in order to reconstruct the encrypted PAD. This is a very difficult task for unauthorized users.

With the encrypted PAD, the attacker must have the appropriate private key in order to decrypt the document. Even the attacker manages to concatenate the shreds in the right order into an encrypted PAD file, without the correct private key the file is useless.

The process of first encrypting the PAD then shredding it into shreds provides strong protection against potential attacks from inside. Even an attacker has the key to decrypt the PAD, the attacker needs to try all possible permutations of assembling the shreds and use the key to decrypt each one of them. The number of decryption operations is m! if m shreds are needed to recover the original PAD, which is computationally impossible for reasonably large m.

(3) PADs are carefully protected after leaving $S^3$ backend storage.

When a PAD is requested by a user, the user can only read the PAD online. The system does not allow a user to download a PAD; the system does not allow a user to copy the PAD content; the system does not allow a user to copy the screen displaying the PAD either. Literally, the only way for a malicious use to take a PAD away from $S^3$ system is to either remember the PAD content or use a camera to take a picture of the PAD.

When a PAD is displayed on user screen, formatting of the content is altered to include a watermark identifying the user who retrieves the PAD out of $S^3$ backend. Even if a user manages to take a picture of the PAD using a camera, the picture still contains the watermark identifying this user.

When a PAD is opened and displayed on user's screen, the system makes sure that it is indeed the user himself and only the user himself is reading the PAD.

A summary of the security features of $S^3$ system is listed in Table 2 and Table 3. Table 2 lists the possible threats at each component of the system, and Table 3 lists the protection technologies in the $S^3$ system to mitigate those threats.

TABLE 2

| Component | Use Case | Threat |
|---|---|---|
| Client side | User authentication | Unauthotized access<br>Unrestricted access<br>User identification theft |
| | View PAD | Save PAD locally<br>Capture screen when showing a PAD<br>Take a picture of a PAD<br>Read PAD at unsafe location<br>Unauthotized user reads PAD displayed on authorized user's screen |

TABLE 2-continued

| Component | Use Case | Threat |
|---|---|---|
| | Upload PAD | Leak the original PAD file after uploading PAD into $S^3$ backend |
| Server side | PAD process | Temporary file leak |
| | PAD storage | Packet sniffer between PAD processor and DFS<br>PAD Metadata database leak<br>DFS file leak<br>Unauthorized network access |
| Client server communication | Upload PAD | Packet sniffer |
| | View PAD | Packet sniffer |
| | User authentication | Man-in-the-middle |

TABLE 3

| Component | Use Case | Mitigation/Protection Tech |
|---|---|---|
| Client side | User authentication | User credential and biometric information based access control<br>Geo-location based access control<br>Check-concurrent logins of the same user from different geo-locations. |
| | View PAD | Disable PAD download<br>Disable PrintScreen when showing a PAD, watermark the user ID into every paragraph of the PAD<br>Watermark the user ID into every paragraph of the PAD<br>Geo-location based PAD access control<br>Require facial information for authentication when showing a PAD |
| | Upload PAD | Delete original PAD file upon after uploading |
| Sever side | PAD process | In-memory process, no temporary file generated |
| | PAD storage | Randomly distribute shreds to DFS<br>CA based access control to metadata database server, strict user access control to database<br>PAD encrypting and PAD shredding<br>CA based access control to DFS nodes |
| Client server communication | Upload PAD | Encryption, VPN |
| | View PAD | Encryption, VPN |
| | User authentication | Encryption, VPN |

$S^3$ backend system uses a novel hybrid distributed storage. The idea of using multiple nodes to build a distributed system for storage has been extensively studied before. In order to provide high level of availability and the robustness against node failures, a DFS usually has redundancy of a file stored in the system. A DFS can either clone the entire file into multiple nodes in the system, or adopt certain coding scheme to encode the file into multiple pieces so that using a subset of the pieces can recover the original file. The former scheme is generally referred as file-replication, and the later one is generally referred as file-fragmentation. The $S^3$ backend system adopts a hybrid approach in storing the PADs. For each PAD, the system first fragments the PAD into many shreds, and then saves the shreds in storage by replicating each shred. The combination of fragmentation and replication has the advantage of each scheme and also makes those two schemes to complement each other to achieve both simplicity of system implementation and high level of security.

$S^3$ backend system uses a novel fragmentation mechanism. The file-fragmentation schemes used in most DFS systems are usually based on secret sharing. In general, an (m,n) secret sharing scheme, 1≤m≤n, breaks a file f into n shreds ($f_0, \ldots, f_{n-1}$), such that any m of the shreds are enough to reconstruct f, while a subset of fewer than m shreds give no information on f. Schemes that rely on fragmenting a document via secret sharing so that the original file can be recovered from any m out of n shreds suffer of a major security flaw, i.e., they ignore the importance of the ordering of the shreds during the recovering phase of the document. Indeed, if recovering the document does not depend on the ordering of the m shreds, an attacker can recover the original document after successfully collecting enough of its shreds. Although cryptography is very helpful in protecting a document against attacks especially when combined with file-fragmentation, an attacker who has access to the security key can break in. The attacker with access to the cryptography key needs to collect enough fragments of the document and decrypt one fragment at the time. On the contrary, if the process imposes a novel functionality that the ordering of the fragments plays a key role in the correct reassembly of the document, then the task becomes massively more complicated for the attacker. Indeed, if the document is first encrypted and then shredded into n pieces, an attacker, who has stolen the key needs to collect at least m shreds of the original document, and then properly place the m shreds in the right order to decrypt the entire document. As a consequence, the attacker has to try m! different permutations of the shreds and decrypt each permutation once, i.e. m! decryptions (while the attacker would need to execute only m decryptions without ordering). To complicate the break-in task even more, k empty fragments are generated per each PAD (fragments that are not carrying any content attached to the original document and not being watermarked) and interleave them with the fragments carrying the content of the PAD before transmitting the fragments to the back-end storage servers. In this way, an attacker has to try $$\binom{m+k}{k} m!$$

cases in order to recover the original PAD.

$S^3$ backend system uses an access control and permission granting scheme based on geo-location and biometric information. By leveraging the Boeing xGPS system, which is able to perform the task even under extreme terrain conditions where both commercial and military GPS fails, the $S^3$ system is able to know the geo-location of each client accessing the backend and apply security polices based on geo-location of the client. For instance, the system can limit the viewing of PADs to devices located at certain authorized facilities (referred to as safe zones); the system can deny the PAD downloading request of a privileged user if the user is not in a safe zone. The $S^3$ backend also keeps monitoring a user's biometric feature when the user is accessing PADs. By leveraging biometric information of a user, the system can ensure that it is indeed the user being authenticated to open a PAD who is reading a PAD. The system can also enforce a policy that denies the accessing of PADs if multiple users are in front of the same device, so as to prevent an unauthorized user from peeking at the PADs.

In an example, a savvy malicious insider may try to foul the $S^3$ security process by complying with the above procedure to retrieve a PAD by taking a picture of the opened PAD in browser and saving the picture for illegal (non-compliant) distribution. PADs saved in local disk of a privileged user can also be potentially distributed illegally. A malicious insider with privileged user permission can download a PAD in security enabled PDF format and copy the PDF to unauthorized device via email, FTP, etc. As the unauthorized device will not have $S^3$ software installed, the system will not know how the PAD is accessed at the unauthorized device.

As described above, the PAD content shown in an unprivileged user's browser is watermarked. Thus the picture is easily identifiable using pattern matching techniques instrumented to execute pattern matching against the set of watermarks (i.e., electronic signatures indiscernible to human eyes) representative of the exhaustive list of PADs stored in the $S^3$ system. The PAD downloaded by a privileged user also has the watermark embedded in the PDF pages. Further, some fingerprint information is also embedded into metadata of the PDF file to assist identifying the PAD. The watermark in each page of a PAD and the fingerprint information in metadata of the downloaded PDF are referred as the signature of a PAD. In an example version of $S^3$ system, client side deep inspection and network infrastructure monitoring are used to detect unauthorized distribution of PAD using the embedded signature.

Client side deep inspection can be implemented by enhancing the S3-SRV system service running on each $S^3$ client device so that (1) this service monitors all file operations on the client and searches for PAD signatures in file, and (2) this service inspects network traffic of the client machine and searches for PAD signatures in network flows. Certain security policies can be adopted at the client side in case a file matches a PAD signature. For example, that file may be deleted based on the permission of the file owner in $S^3$ system. If the user does not have privileged permission (i.e., the user cannot download PAD from $S^3$ system), the S3-SRV service should delete the file and fire an alarm to $S^3$ backend. If the user is a privileged user but the device is not located at a "safe zoon", the file should still be deleted. In case a PAD signature is identified in the network traffic going out of the client, the S3-SRV service can block the outgoing traffic and inform the $S^3$ backend of this potential PAD leakage event.

Monitoring on network infrastructure may include deploying PAD signature detecting functionality cross a corporate VPN or even the Internet. Even if a malicious user manages to copy PADs to an unauthorized device so as to bypass the client side deep inspection, the PAD can be detected when it is transmitted over the network if it is sent out by the malicious user via email or web post. The $S^3$ capable network device, such as a router with PAD signature matching functionality, can block the transmission and fire an alarm to the $S^3$ backend.

Although specific formats or structures are used as examples in the foregoing description regarding the flows, the captured payloads, the signature terms, filtering layer/qualification loop structures, etc., one skilled in the art, with the benefit of this disclosure, will recognize that other formats or structures may also be used in the system and methods described without deviating from the spirit of the invention.

Embodiments of the invention may be implemented on virtually any type of computer regardless of the platform being used. For example, as shown in FIG. 3D, a computer system (400) includes one or more processor(s) (402), associated memory (404) (e.g., random document access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor) for example to display various results such as the feature vectors, the principal components, the application space, the signatures, etc. The computer system (400) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing a secured document, comprising:
   storing, by a first computer processor of a first secured document server, the secured document by storing each of a plurality of document shreds of the secured document in one of a plurality of distributed repositories, wherein the secured document comprises information regarding a security policy of the secured document;
   receiving, from a secured document user device, a request to access the secured document by a requesting user;
   retrieving, in response to the request and by a second computer processor of a second secured document server, the secured document by combining the plurality of document shreds of the secured document retrieved from the plurality of distributed repositories; and
   providing, when the request is authenticated based on a pre-determined criterion, the secured document to the requesting user, comprising:
      generating, by the second computer processor and in response to retrieving the secured document, an image representing human discernible content of the secured document;
      modifying, by the second computer processor, the image to generate a modified image that is embedded with a digital watermark, wherein the digital water mark is human indiscernible and represents the security policy extracted from the secured document; and
      sending, to the secured document user device for displaying to the requesting user, the modified image embedded with the digital watermark.

2. The method of claim 1, further comprising:
   intercepting, by a secured document monitor, data transmission to a destination device;
   determining, by the secured document monitor, that the data transmission contains the digital watermark;
   extracting the digital watermark from the data transmission to identify the security policy associated with the secured document; and
   generating an alert in response to detecting a violation of the security policy with respect to the data transmission to the destination device.

3. The method of claim 2,
   wherein the security policy forbids any data transmission of the modified image embedded with the digital watermark.

4. The method of claim 2,
   wherein the security policy restricts data transmission of the modified image embedded with the digital watermark to an authorized destination, and
   wherein the violation comprises a mismatch between the destination device and the authorized destination.

5. The method of claim 2,
   wherein the digital watermark comprises identification information regarding at least one selected from a group consisting of the requesting user and the secured document user device, and
   wherein the alert comprises the identification information.

6. The method of claim 1, further comprising:
   determining, in response to the request, a geo-location of the secured document user device,
   wherein the security policy requires that access to the secured document is restricted to an authorized access geo-location,
   wherein sending the request by the requesting user requires the requesting user to be physically present with the secured document user device, and
   wherein authenticating the request requires a match between the geo-location of the secured document user device and the authorized access geo-location, the method further comprising:
   generating an alert without providing the secured document to the requesting user when a mismatch is determined between the geo-location of the secured document user device and the authorized access geo-location.

7. The method of claim 6, wherein determining the geo-location of the secured document user device comprises:
   receiving and analyzing, by the secured document user device, a plurality of broadcasted triangulation signals to generate a data item representing the geo-location of the secured document user device;
   receiving, from the secured document user device by the second secured document server, the data item representing the geo-location of the secured document user device; and
   analyzing, by the second secured document server, the data item to determine the geo-location of the secured document user device.

8. The method of claim 1,
   wherein the first secured document server, the second secured document server, the secured document user device, and the plurality of repositories are coupled via a computer network, and wherein the storing, receiving, retrieving, and providing are via the computer network.

9. A system for managing a secured document, comprising:
a first secured document server comprising a first computer processor and configured to:
store the secured document by storing each of a plurality of document shreds of the secured document in one of a plurality of distributed repositories, wherein the secured document comprises information regarding a security policy of the secured document;
a second secured document server comprising a second computer processor and configured to:
receive, from a secured document user device, a request to access the secured document by a requesting user;
retrieve, in response to the request, the secured document by combining the plurality of document shreds of the secured document retrieved from the plurality of distributed repositories; and
providing, when the request is authenticated based on a pre-determined criterion, the secured document to the requesting user, comprising:
generating, in response to retrieving the secured document, an image representing human discernible content of the secured document;
modifying the image to generate a modified image that is embedded with a digital watermark, wherein the digital water mark is human indiscernible and represents the security policy extracted from the secured document; and
sending, to the secured document user device for displaying to the requesting user, the modified image embedded with the digital watermark;
the secured document user device configured to:
send, based on an input of the requesting user, the request to the second secured document server; and
display, to the requesting user, the modified image embedded with the digital watermark;
the plurality of distributed repositories configured to store the plurality of document shreds; and
a computer network configured to couple the first secured document server, the second secured document server, the secured document user device, and the plurality of repositories, wherein the storing, receiving, retrieving, and providing are via the computer network.

10. The system of claim 9, further comprising a secured document monitor coupled to the computer network and configured to:
intercept, from the computer network, data transmission to a destination device;
determine that the data transmission contains the digital watermark;
extract the digital watermark from the data transmission to identify the security policy associated with the secured document; and
generate an alert in response to detecting a violation of the security policy with respect to the data transmission to the destination device.

11. The system of claim 10,
wherein the security policy forbids any data transmission of the modified image embedded with the digital watermark.

12. The system of claim 11,
wherein the security policy restricts data transmission of the modified image embedded with the digital watermark to an authorized destination, and
wherein the violation comprises a mismatch between the destination device and the authorized destination.

13. The system of claim 11,
wherein the digital watermark comprises identification information regarding at least one selected from a group consisting of the requesting user and the secured document user device, and
wherein the alert comprises the identification information.

14. The system of claim 10, wherein the second secured document server is further configured to:
determine, in response to the request, a geo-location of the secured document user device; and
generate an alert without providing the secured document to the requesting user when a mismatch is determined between the geo-location of the secured document user device and an authorized access geo-location,
wherein the security policy requires that access to the secured document is restricted to the authorized access geo-location,
wherein sending the request by the requesting user requires the requesting user to be physically present with the secured document user device, and
wherein authenticating the request requires a match between the geo-location of the secured document user device and the authorized access geo-location.

15. The system of claim 14,
wherein the secured document user device is further configured to:
receive and analyze a plurality of broadcasted triangulation signals to generate a data item representing the geo-location of the secured document user device, and
wherein the second secured document server is further configured to:
receive, from the secured document user device, the data item representing the geo-location of the secured document user device; and
analyze the data item to determine the geo-location of the secured document user device.

16. A non-transitory computer readable medium embodying instructions for managing a secured document, the instructions when executed by a processor comprising functionality for:
storing the secured document by storing each of a plurality of document shreds of the secured document in one of a plurality of distributed repositories, wherein the secured document comprises information regarding a security policy of the secured document;
receiving, from a secured document user device, a request to access the secured document by a requesting user;
retrieving, in response to the request, the secured document by combining the plurality of document shreds of the secured document retrieved from the plurality of distributed repositories; and
providing, when the request is authenticated based on a pre-determined criterion, the secured document to the requesting user, comprising:
generating, by the processor and in response to retrieving the secured document, an image representing human discernible content of the secured document;
modifying, by the processor, the image to generate a modified image that is embedded with a digital watermark, wherein the digital water mark is human indiscernible and represents the security policy extracted from the secured document; and
sending, to the secured document user device for displaying to the requesting user, the modified image embedded with the digital watermark.

17. The non-transitory computer readable medium of claim 16, the instructions when executed by the processor further comprising functionality for:
- intercepting, by a secured document monitor, data transmission to a destination device;
- determining, by the secured document monitor, that the data transmission contains the digital watermark;
- extracting the digital watermark from the data transmission to identify the security policy associated with the secured document; and
- generating an alert in response to detecting a violation of the security policy with respect to the data transmission to the destination device.

18. The non-transitory computer readable medium of claim 17,
- wherein the security policy forbids any data transmission of the modified image embedded with the digital watermark.

19. The non-transitory computer readable medium of claim 17,
- wherein the security policy restricts data transmission of the modified image embedded with the digital watermark to an authorized destination, and
- wherein the violation comprises a mismatch between the destination device and the authorized destination.

20. The non-transitory computer readable medium of claim 17,
- wherein the digital watermark comprises identification information regarding at least one selected from a group consisting of the requesting user and the secured document user device, and
- wherein the alert comprises the identification information.

21. The non-transitory computer readable medium of claim 16, the instructions when executed by the processor further comprising functionality for:
- determining, in response to the request, a geo-location of the secured document user device,
- wherein the security policy requires that access to the secured document is restricted to an authorized access geo-location,
- wherein sending the request by the requesting user requires the requesting user to be physically present with the secured document user device, and
- wherein authenticating the request requires a match between the geo-location of the secured document user device and the authorized access geo-location,
- wherein the instructions when executed by the processor further comprises functionality for generating an alert without providing the secured document to the requesting user when a mismatch is determined between the geo-location of the secured document user device and the authorized access geo-location.

22. The non-transitory computer readable medium of claim 21, wherein determining the geo-location of the secured document user device comprises:
- receiving and analyzing, by the secured document user device, a plurality of broadcasted triangulation signals to generate a data item representing the geo-location of the secured document user device;
- receiving, from the secured document user device by the second secured document server, the data item representing the geo-location of the secured document user device; and
- analyzing, by the second secured document server, the data item to determine the geo-location of the secured document user device.

23. The non-transitory computer readable medium of claim 16,
- wherein the first secured document server, the second secured document server, the secured document user device, and the plurality of repositories are coupled via a computer network, and
- wherein the storing, receiving, retrieving, and providing are via the computer network.

* * * * *